(12) United States Patent
Werner

(10) Patent No.: US 10,404,100 B2
(45) Date of Patent: Sep. 3, 2019

(54) DOUBLE-D BASED PAD MAGNETICS FOR REDUCED EMISSIONS IN FLUSH MOUNTED AND BURIED WIRELESS POWER TRANSFER APPLICATIONS

(71) Applicant: WiTricity Corporation, Watertown, MA (US)

(72) Inventor: Michael Werner, Markt Schwaben (DE)

(73) Assignee: WiTricity Corporation, Watertown, MA (US)

( * ) Notice: Subject to any disclaimer, the term of this patent is extended or adjusted under 35 U.S.C. 154(b) by 233 days.

(21) Appl. No.: 15/183,394

(22) Filed: Jun. 15, 2016

(65) Prior Publication Data

US 2017/0366046 A1  Dec. 21, 2017

(51) Int. Cl.
| | |
|---|---|
| *H01F 38/00* | (2006.01) |
| *H02J 50/12* | (2016.01) |
| *H02J 50/70* | (2016.01) |
| *H01F 27/28* | (2006.01) |
| *H01F 38/14* | (2006.01) |

(Continued)

(52) U.S. Cl.
CPC ............ *H02J 50/12* (2016.02); *B60L 53/12* (2019.02); *H01F 27/2823* (2013.01); *H01F 27/2871* (2013.01); *H01F 27/365* (2013.01); *H01F 38/14* (2013.01); *H02J 5/005* (2013.01); *H02J 7/025* (2013.01); *H02J 50/10* (2016.02); *H02J 50/70* (2016.02); *H04B 5/0037* (2013.01); *H04B 5/0075* (2013.01); *H02J 7/0042* (2013.01); *H02J 2007/0096* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ........................................................ 307/104
See application file for complete search history.

(56) References Cited

U.S. PATENT DOCUMENTS

| | | |
|---|---|---|
| 10,003,217 B2 | 6/2018 | Kuerschner et al. |
| 2012/0025602 A1 | 2/2012 | Boys et al. |

(Continued)

FOREIGN PATENT DOCUMENTS

| | | |
|---|---|---|
| JP | 2014082339 A | 5/2014 |
| WO | WO-2016114893 A1 | 7/2016 |

OTHER PUBLICATIONS

International Search Report and Written Opinion—PCT/US2017/037047—ISA/EPO—Sep. 14, 2017.

*Primary Examiner* — Rexford N Barnie
*Assistant Examiner* — Dru Parries
(74) *Attorney, Agent, or Firm* — Knobbe, Martens, Olson & Bear, LLP

(57) ABSTRACT

An apparatus for wirelessly transferring charging power is provided. The apparatus comprises a ferrite structure. The apparatus comprises a first coil comprising a first conductor wound in a first layer at an outer side of the first coil and wound in a first plurality of stacked layers on an inner side of the first coil. At least one layer of the first plurality of stacked layers on the inner side of the first coil is recessed into the ferrite structure. The apparatus comprises a second coil comprising a second conductor wound in a second layer at an outer side of the second coil and wound in a second plurality of stacked layers on an inner side of the second coil. At least one layer of the second plurality of stacked layers on the inner side of the second coil recessed into the ferrite structure.

23 Claims, 4 Drawing Sheets

(51) Int. Cl.
*H02J 7/02* (2016.01)
*H01F 27/36* (2006.01)
*H02J 5/00* (2016.01)
*H02J 50/10* (2016.01)
*H04B 5/00* (2006.01)
*B60L 53/12* (2019.01)
*H02J 7/00* (2006.01)

(56) References Cited

U.S. PATENT DOCUMENTS

| | | |
|---|---|---|
| 2012/0049850 A1 | 3/2012 | Reime |
| 2014/0284159 A1 | 9/2014 | Boys |
| 2014/0327391 A1 | 11/2014 | Niederhauser et al. |
| 2015/0091519 A1 | 4/2015 | Komma et al. |
| 2015/0170832 A1 | 6/2015 | Covic et al. |
| 2015/0170833 A1 | 6/2015 | Widmer et al. |

DOUBLE-D BASED PAD MAGNETICS FOR REDUCED EMISSIONS IN FLUSH MOUNTED AND BURIED WIRELESS POWER TRANSFER APPLICATIONS

FIELD

This application is generally related to wireless power charging of chargeable devices such as electric vehicles, and more specifically to double-D base pad magnetics for reduced emissions in flush mounted and buried wireless power transfer applications.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device transmits power to a secondary (or "pick-up") power receiver device. Each of the transmitter and receiver power devices includes inductors, typically coils or windings of electric current conveying media. An alternating current in the primary inductor produces a fluctuating magnetic field. When the secondary inductor is placed in proximity to the primary inductor, the fluctuating magnetic field induces an electromotive force (EMF) in the secondary inductor, thereby transferring power to the secondary power receiver device.

SUMMARY

According to some implementations, an apparatus for wirelessly transferring charging power is provided. The apparatus comprises a ferrite structure. The apparatus comprises a first coil comprising a first conductor wound in a first layer at an outer side of the first coil and wound in a first plurality of stacked layers on an inner side of the first coil. At least one layer of the first plurality of stacked layers on the inner side of the first coil is recessed into the ferrite structure. The apparatus comprises a second coil comprising a second conductor wound in a second layer at an outer side of the second coil and wound in a second plurality of stacked layers on an inner side of the second coil. At least one layer of the second plurality of stacked layers on the inner side of the second coil is recessed into the ferrite structure.

In some other implementations, a method for wirelessly transferring charging power is provided. The method comprises driving each of a first coil and a second coil with a current to generate an alternating magnetic field. The first coil has a first winding path and the second coil has a second winding path. The method further comprises wirelessly transferring charging power to at least one vehicle pad via the alternating magnetic field. The first coil comprises a first conductor wound in a first layer at an outer side of the first coil and wound in a first plurality of stacked layers on an inner side of the first coil. At least one layer of the first plurality of stacked layers on the inner side of the first coil is recessed into the ferrite structure. The second coil comprises a second conductor wound in a second layer at an outer side of the second coil and wound in a second plurality of stacked layers on an inner side of the second coil. At least one layer of the second plurality of stacked layers on the inner side of the second coil recessed into the ferrite structure.

In yet other implementations an apparatus for wirelessly transferring charging power is provided. The base pad comprises first means for wirelessly transferring power, having a first magnetic pole that is shifted from a geometric center to an inner side of first means for wirelessly transferring power. The base pad comprises second means for wirelessly transferring power, having a second magnetic pole that is shifted from a geometric center to an inner side of the second means for wirelessly transferring power.

In yet other implementations, a method for fabricating an apparatus for wirelessly transferring charging power is provided. The method comprises providing a ferrite structure. The method further comprises winding a first conductor of a first coil in a first layer at an outer side of the first coil and in a first plurality of stacked layers on an inner side of the first coil. At least one layer of the first plurality of stacked layers on the inner side of the first coil is recessed into the ferrite structure. The method further comprises winding a second conductor of a second coil in a second layer at an outer side of the second coil and in a second plurality of stacked layers on an inner side of the second coil. At least one layer of the second plurality of stacked layers on the inner side of the second coil is recessed into the ferrite structure.

In yet other implementations, another apparatus for wirelessly transferring charging power is provided. The apparatus includes a first coil including a first plurality of conductive windings wound about a first opening. The first plurality of conductive windings are wound in a first plurality of stacked layers on a first side of the first coil. The number of layers on the first side of the first coil is greater than the number of layers on a second side of the first coil. The apparatus further includes a second coil positioned substantially co-planar with the first coil and including a second plurality of conductive windings wound about a second opening. The second plurality of conductive windings are wound in a second plurality of stacked layers on a third side of the second coil. The number of layers on the third side of the second coil is greater than the number of layers on a fourth side of the second coil. The first side of the first coil is positioned closer to the third side of the second coil than to the fourth side of the second coil. The apparatus further includes a ferrite structure overlapping at least a portion of the first coil and the second coil.

DETAILED DESCRIPTION

Figure 1:
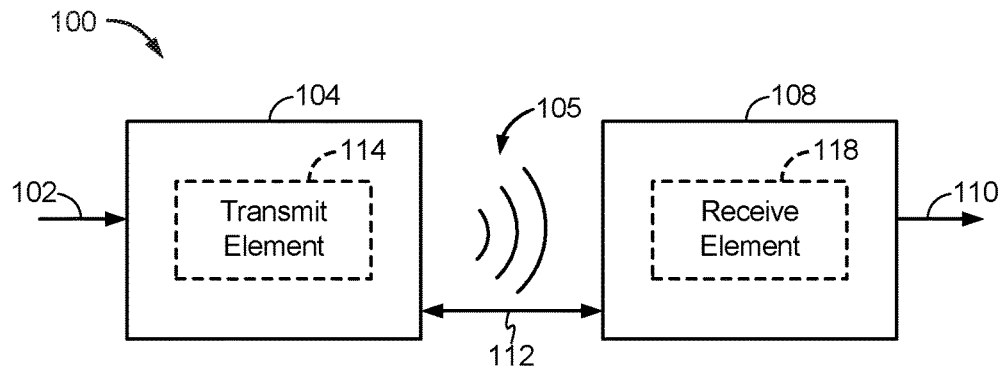
FIG. 1 is a functional block diagram of a wireless power transfer system, in accordance with some implementations.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wireless power transfer systems utilize a primary coil to generate an alternating magnetic field from which a secondary or receiving coil may wirelessly extract energy. Current vendors are requesting primary coils within base pads that are either flush mounted or buried in parking surfaces. Such requests necessarily increase the distance between the primary coil and the secondary coils in chargeable vehicles. Such increased distances result in the need for alternating fields of increasing strength to transfer a given amount of power, which increases the electromagnetic field emissions levels of primary coil designs. Considering current legal safety limits on electromagnetic field emissions, double-D base pad magnetics for reduced emissions in flush mounted and buried wireless power transfer applications are desirable.

FIG. 1 is a functional block diagram of a wireless power transfer system 100, in accordance with an illustrative embodiment. Input power 102 may be provided to a transmitter circuit 104 from a power source (not shown in this figure) to generate a wireless (e.g., magnetic or electromagnetic) field 105 for performing energy transfer. A receiver circuit 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element circuit 114 for transmitting/coupling energy to the receiver 108. The receiver 108 may include a power receiving element circuit 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
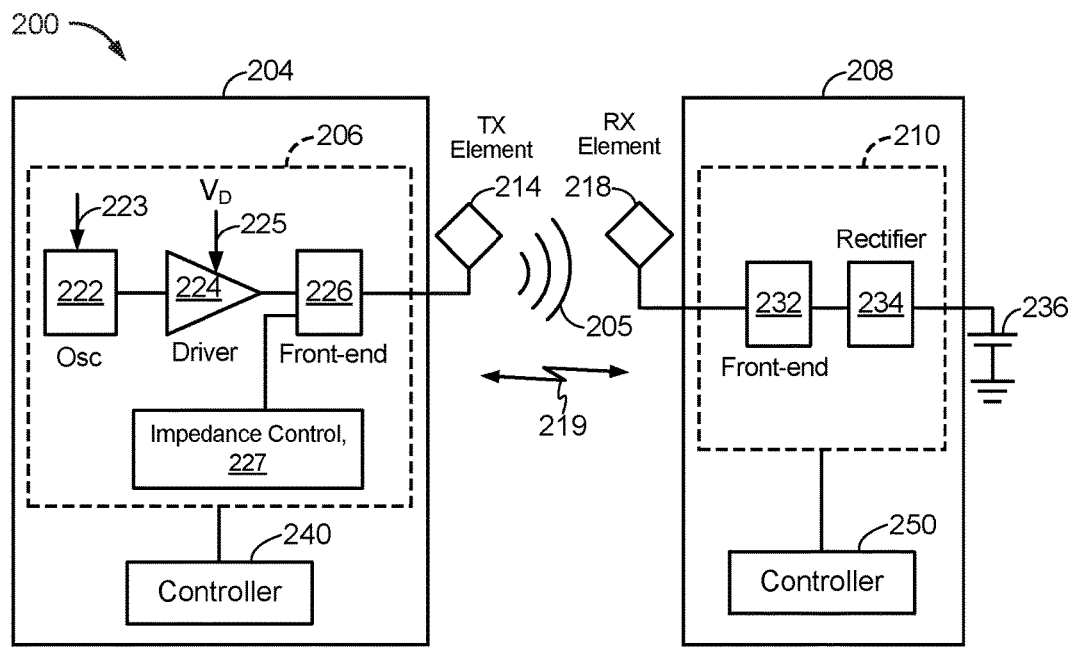
FIG. 2 is a functional block diagram of a wireless power transfer system, in accordance with some other implementations.

FIG. 2 is a functional block diagram of a wireless power transfer system 200, in accordance with another illustrative embodiment. The system 200 may be a wireless power transfer system of similar operation and functionality as the system 100 of FIG. 1. However, the system 200 provides additional details regarding the components of the wireless power transfer system 200 than FIG. 1. The system 200 may include a transmitter circuit 204 and a receiver circuit 208. The transmitter 204 (also referred to herein as power transmitting unit, PTU) may include transmit circuitry 206 that may include an oscillator circuit 222, a driver circuit 224, a front-end circuit 226, and an impedance control module circuit 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module circuit 227 may control the front-end circuit 226.

The transmitter 204 may further include a controller circuit 240 operably coupled to the transmit circuitry 206 configured to control one or aspects of the transmit circuitry 206 or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller circuit 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver. In some aspects, the wireless power transfer system 200 represents a more detailed view of the wireless power transfer system 100.

Figure 3:
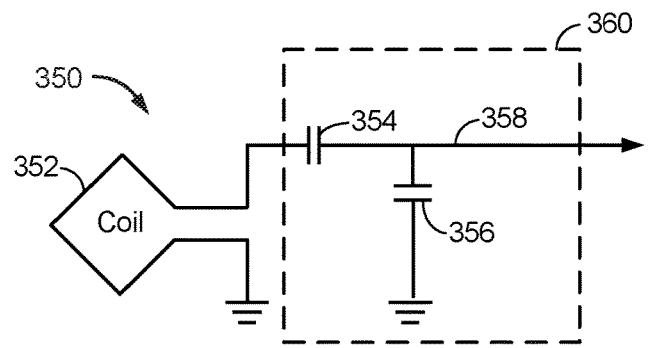
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element circuit 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Embodiments and descriptions provided herein may be applied to resonant and non-resonant implementations (e.g., resonant and non-resonant circuits for power transmitting or receiving elements and resonant and non-resonant systems). In some aspects, the transmit or receive circuitry 350 may facilitate wireless power reception or transmission at a frequency that is more efficient than wireless power reception or transmission using transmit or receive circuitry without the tuning circuit 360.

Figure 4:
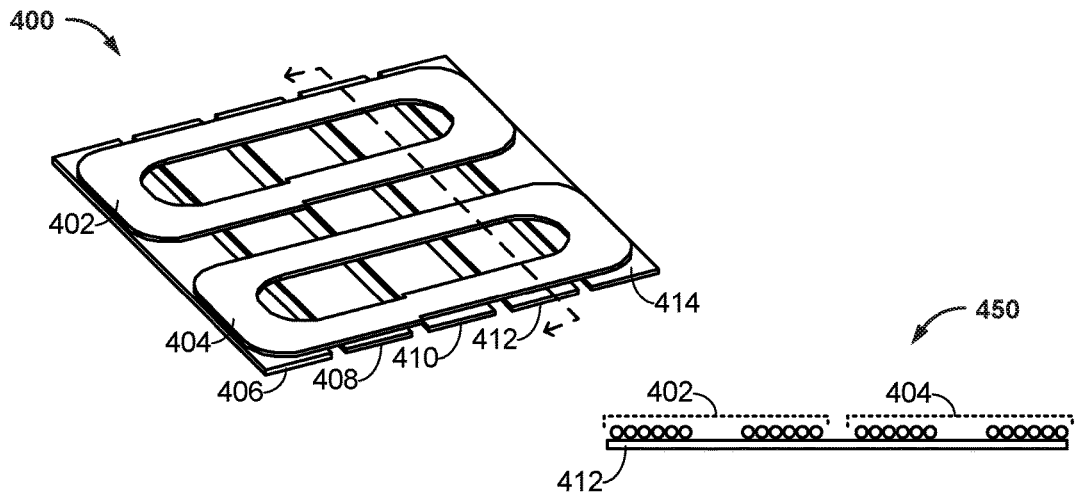
FIG. 4 illustrates a double-D coil arrangement in a base pad, in accordance with some implementations.

FIG. 4 illustrates a double-D coil arrangement in a base pad 400, in accordance with some implementations. The base pad 400 comprises a first coil 402 and second coil 404 disposed adjacent to one another in a "double D" coil configuration. A first conductor of the first coil 402 and a second conductor of the second coil 404 are each wound on a plane on or over a plurality of ferrite structures 406, 408, 410, 412, 414, as shown by the dotted line cut away, in view 450. The base pad 400 may be mounted on a driving or parking surface. Such mounting arrangement allows the base pad 400 to be as close as practical to a vehicle pad (not shown) situated above the base pad 400 for wireless power transfer. In some implementations, the base pad 400 may have total outside dimensions of 650 mm×650 mm×20 mm. However, the present application is not so limited and any outside dimensions may be utilized. In various embodiments, any of the coils described herein (for example, the first coil 402 and the second coil 404) can correspond to the power transmitting elements described in FIGS. 1-3 (for example, the transmit element 114, the TX element 214, etc.).

In various embodiments of operation, the coils 402 and 404 can be driven with current such that the direction of current is the same in the inner adjacent sides of each coil 402 and 404. For example, the first coil 402 can be driven with current flowing clockwise while the second coil 404 is driven with current flowing counterclockwise (and vice versa). Accordingly, two poles can be created within the openings of each coil 402 and 404. Flux can exit from one pole in one opening and arch over the middle at the center of the coils 402 and 404 (in a horizontal fashion), and then enter at the other pole in the other opening, channeled through the ferrite structures 406, 408, 410, 412, 414. In some implementations, the first coil 402 and the second coil 404 may be wound from a single conductor (e.g., litz wire) in a series connection. In some other implementations, the first coil 402 and the second coil 404 may be wound from distinct (i.e., separate or different) conductors.

Figure 5:
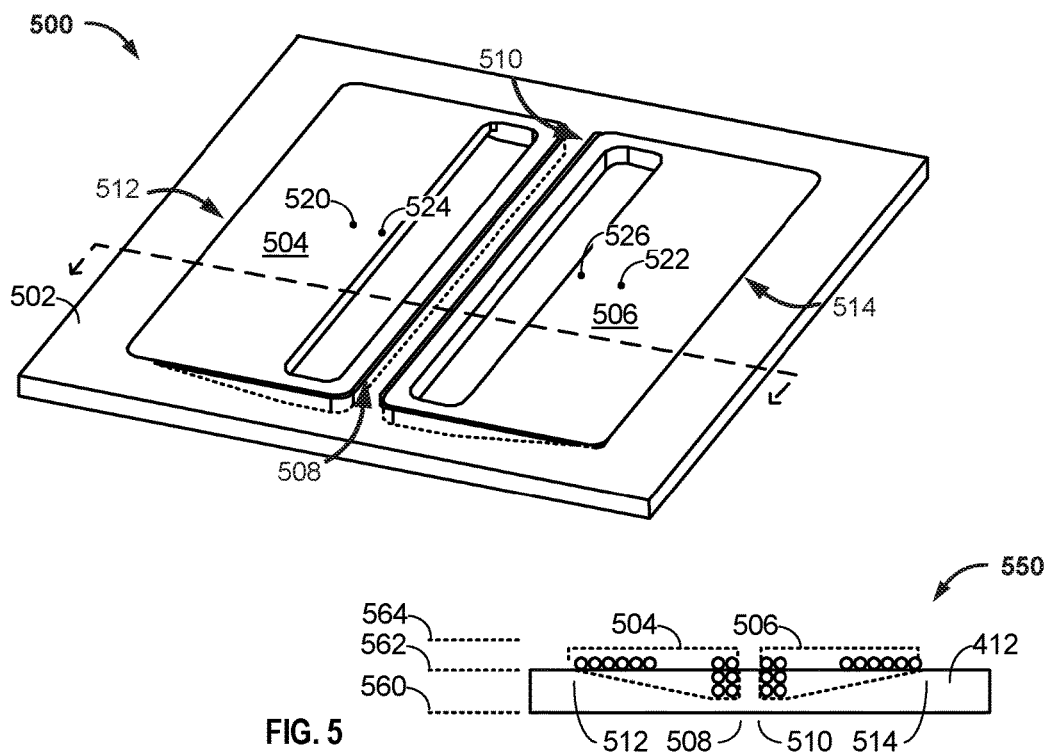
FIG. 5 illustrates a double-D stacked coil arrangement in a base pad, in accordance with some implementations.

Some vendors desire that base pads be flush mounted or buried in the driving or parking surface due to vehicle clearance as well as cosmetic considerations. In such flush mount implementations, the base pad 400 may be farther removed (e.g., by approximately 60 mm for one exemplary application) from the vehicle pad (not shown). In such buried mount implementations, the base pad 400 may be additionally farther removed (e.g., by approximately 130 mm for another exemplary application) from the vehicle pad (not shown). To accommodate for this increased z-gap between the base pad 400 and the vehicle pad, increased currents are driven through the first coil 402 and the second coil 404 in order to increase the magnetic field strength such that its magnitude is sufficient at the vehicle pad for rated wireless charging. Such increases in driving current increase electromagnetic emissions from the base pad 400. To avoid such increased electromagnetic emissions, power ratings may be reduced (e.g., from 20 kW to 10 kW) or significantly larger vehicle pads may be used. Both options may be potentially costly. FIG. 5 shows an alternative implementation to that shown in FIG. 4.

FIG. 5 illustrates a double-D stacked coil arrangement in a base pad 500, in accordance with some implementations. The base pad 500 includes a ferrite structure 502. The base pad 500 further comprises a first coil 504 and a second coil 506. In some implementations, the first coil 504 and the second coil 506 comprise a double D coil configuration. In some implementations, the first coil 504 and the second coil 506 may be wound from a single conductor (e.g., litz wire) in a series connection. In some other implementations, the first coil 504 and the second coil 506 may be wound from distinct (i.e., separate or different) conductors. An inner side 508 of the first coil 504 is disposed adjacent to or faces an inner side 510 of the second coil 506. At least a portion of the first coil 504 may be recessed into the ferrite structure 502 and may comprise a first conductor wound in a first single layer at an outer side of the first coil 504 and wound in a first plurality of stacked layers on an inner side of the first coil 504. At least a portion of the second coil 506 is also recessed into the ferrite structure 502 and may comprise a second conductor wound in a second single layer at an outer side of the second coil 506 and wound in a second plurality of stacked layers on an inner side of the second coil 506. Thus, as shown in FIG. 5, the term "inner side" is with respect to the orientation of the first coil 504 and the second coil 506, e.g., the side of the first coil 504 facing and disposed closest to the second coil 506, and the side of the second coil 506 facing and disposed closest to the first coil 504. Contrarily, the term "outer side" indicates a side opposite the "inner side" of the same coil.

In the illustrated embodiment, the ferrite structure 502 extends laterally beyond the edges of the first coil 504 and the second coil 506 such that there is a ferrite border along the entire perimeter of each of the first coil 504 and the second coil 506. The first coil 504 is disposed adjacent to the second coil 506 to form a "double D" arrangement. This is more clearly shown in the view 550 showing the dotted line cutaway. In some embodiments, the ferrite structure 502 can be configured having gaps such as those shown between the ferrite structures 406, 408, 410, 412, 414 of FIG. 4. In some embodiments, the ferrite structure 502 can be made of individual blocks, which in some embodiments can cover the entire surface of the pad 500.

As shown in view 550, each of the first coil 504 and the second coil 506 may have one or more columns of windings, each column having a plurality of stacked windings. Having a plurality of stacked windings on an inner side of the first coil 504 and a single layer of windings on an outer side of the first coil 504 shifts a first magnetic pole 524 of the base pad 500 (e.g., the magnetic pole 524 of the first coil 504) from a geometric center 520 of the first coil 504 toward the inner edge 508 of the first coil 504. Likewise, having a plurality of stacked windings on an inner side of the second coil 506 and a single layer of windings on an outer side of the second coil 506 shifts a second magnetic pole 526 of the base pad 500 (e.g., the magnetic pole 5126 of the second coil 506) from a geometric center 522 of the second coil 506 toward the inner edge 510 of the second coil 506. This is in contrast to the base pad 400 of FIG. 4 where windings of the first coil 402 and of the second coil 404 are stacked symmetrically at an inner side and at an outer side of the coils 402, 404 (e.g., all windings are stacked in the same number of layers and/or the same number of columns with the same spacing between windings at each of the inner and outer sides of the coils). Thus, in FIG. 4, a first magnetic pole of the base pad 400 may be located substantially at the geometric center of the first coil 402 and a second magnetic pole of the base pad 400 may be located substantially at the geometric center of the second coil 404.

As shown in view 550 of FIG. 5, at least one layer of the first plurality of stacked layers on the inner side 508 of the first coil 504 may be recessed into the ferrite structure 502. Likewise, at least one layer of the second plurality of stacked layers on the inner side 510 of the second coil 506 may be recessed into the ferrite structure 502. As shown, the first single layer at the outer side 512 of the first coil 504 and the second single layer at the outer side 514 of the second coil 506 is not recessed in the ferrite structure 502. In various alternative embodiments, various single layers discussed herein (such as the first single layer at the outer side 512 of the first coil 504) can include a plurality of layers. In some embodiments, the number of layers on the outer sides 512 and 514 can be less than the number of layers on the inner sides 508 and 510. Likewise, at least the first (or last) layer of each of the first plurality of stacked layers on the inner side 508 of the first coil 504 and the second plurality of stacked layers on the inner side 510 of the second coil 506 are not recessed in the ferrite structure 502. Thus, the first and second single layers of windings at the outsides of the first and second coils 504, 506 and/or at least one layer of the plurality of stacked layers at the inner sides of the first and second coils 504, 506 may be disposed above a plane flush with the surface of the ferrite structure 502. In this way, minimal ferrite processing may be required and better performance may be attained as compared to either coils as previously described in connection with FIG. 4, or as compared to first and second coils that are fully and completely recessed into a ferrite structure. However, the present application is not so limited and, in some other implementations, all layers of the first and second plurality of stacked layers and/or the first and second single layers may be recessed into the ferrite structure 502. For example, any of the first and second single layers of windings at the outsides of the first and second coils 504, 506 and/or at least one layer of the plurality of stacked layers at the inner sides of the first and second coils 504, 506 may be disposed below (or, in some embodiments, flush with) a plane flush with the surface of the ferrite structure 502. In some embodiments, one inner side can include a plurality of stacked layers while the other side can include fewer layers (for example, a single layer) and can thus be less stacked. Such asymmetrical stacking can be implemented in recessed, protruding, or flush embodiments.

Accordingly, in some implementations, the first coil 504 may also be known as, or comprise at least a portion of first means for wirelessly transferring power. Likewise, the second coil 506 may also be known as, or comprise at least a portion of second means for wirelessly transferring power. In some implementations, the ferrite structure 502 may also be known as, or may comprise at least a portion of means for channeling magnetic flux. In some implementations, the first conductor wound in a first single layer at an outer side 512 of the first coil 504 and wound in a first plurality of stacked layers on an inner side 508 of the first coil 504 may also be known as, or comprise at least a portion of first means for wirelessly transferring power, having a first magnetic pole that is shifted from a geometric center to an inner side of first means for wirelessly transferring power. Likewise, the second conductor wound in a second single layer at an outer side 514 of the second coil 506 and wound in a second plurality of stacked layers on an inner side 510 of the second coil 506 may also be known as, or comprise at least a portion of second means for wirelessly transferring power, having a second magnetic pole that is shifted from a geometric center to an inner side of the second means for wirelessly transferring power.

At least a portion of the second coil 506 is also recessed into the ferrite structure 502 and comprises a second conductor wound in a second single layer at an outer side of the second coil 506 and wound in a second plurality of stacked layers on an inner side of the second coil 506. The base pad 500 of FIG. 5 provides an approximate 40% reduction in electromagnetic emissions in the buried mount implementations (e.g., where a bottom of the base pad 500 is mounted approximately 130 mm under a surface 564) as compared to the base pad 400 of FIG. 4. The benefits are even more pronounced for the flush mount option (e.g., where a bottom of the base pad 500 is mounted approximately 60 mm under a surface 562) since the reduction in coupling between the base pad 400 and a vehicle pad is even less due to reduced physical separation between the base pad 400 and the vehicle pad. Of course, some implementations also contemplate mounting the base pad 500 on a surface 560, rather than flush mounting or burying the base pad 500. In some implementations, the base pad 500 may have outside dimensions of approximately 840 mm×810 mm×35 mm. However, the present application is not so limited and any outside dimensions may be utilized.

In some implementations, successive windings of the first coil 504 are separated by a nonzero distance at the outer side of the first coil 504 (e.g., successive windings are not in physical contact with one another) and successive windings of the second coil 506 are separated by a nonzero distance at the outer side of the second coil 506 (e.g., successive windings are not in physical contact with one another). The nonzero distance separating successive windings of the first coil 504 may be the same as or different from the nonzero distance separating successive windings of the second coil 506. In some other implementations, successive windings of the first coil 504 are substantially in physical contact with one another (however electrically insulated from turn to turn) at the outer side of the first coil 504 and successive windings of the second coil are substantially in physical contact with one another (however electrically insulated from turn to turn) at the outer side of the second coil 506. In some implementations, the ferrite structure 502, the first coil 504 and the second coil 506 are buried in a driving surface 564. In some other implementations, the ferrite structure 502, the first coil 504 and the second coil 506 are flush mounted in a driving surface 562. In yet other implementations, the ferrite structure 502, the first coil 504 and the second coil 506 are mounted on a driving surface 560.

As one non-limiting example, in some buried mount implementations (e.g., where a bottom of the base pad 500 is mounted 130 mm under the driving surface 564) and where 22 kW is wirelessly transferred from a base pad to a vehicle pad, the base pad 400 of FIG. 4 may draw 740 ampere-turns of current and may emit a magnetic field of 82 $\mu$T as measured at a virtual lateral plane approximately 77.5 cm away from a center of the base pad 400. In the same buried mount implementation, the base pad 500 of FIG. 5 may draw 709 ampere-turns of current and emit a magnetic field of just 46.2 $\mu$T as measured at the virtual lateral plane approximately 77.5 cm away from a center of the base pad 500.

In another non-limiting example, in a flush mount implementation (e.g., where a bottom of the base pad 500 is mounted 60 mm under the driving surface 562) and where the 22 kW is wirelessly transferred from the base pad 500 to a vehicle pad, just 407 ampere-turns of current are drawn by the base pad 500 and the base pad 500 emits a magnetic field of just 20.2 $\mu$T as measured at a lateral distance of 10 cm from the base pad 500. The increased coupling achieved by the closer pole spacing resulting from the stacked nature of the windings of the first coil 504 and of the second coil 506 allows the increased z-gap separation inherent to flush mount and buried mount implementations while both maintaining desired levels of wireless power transfer and while keeping magnetic field emissions below regulated levels.

In some embodiments, the first coil 504 can include a first plurality of conductive windings wound about a first opening (for example, at the geometric center 520). The first plurality of conductive windings are wound in a first plurality of stacked layers on the first side 508 of the first coil 504. The number of layers on the first side 508 of the first coil 504 is greater than the number of layers on a second side 512 of the first coil 504. The second coil 506 can be positioned substantially co-planar with the first coil 504 and can include a second plurality of conductive windings wound about a second opening (for example, at the geometric center 522). The second plurality of conductive windings are wound in a second plurality of stacked layers on a third side 510 of the second coil 506. The number of layers on the third side 510 of the second coil 506 is greater than the number of layers on a fourth side 514 of the second coil 506. The first side 508 of the first coil 504 is positioned closer to the third side 510 of the second coil 506 than to the fourth side 514 of the second coil 506. The ferrite structure 502 can overlap at least a portion of the first coil 504 and the second coil 506.

Figure 6:
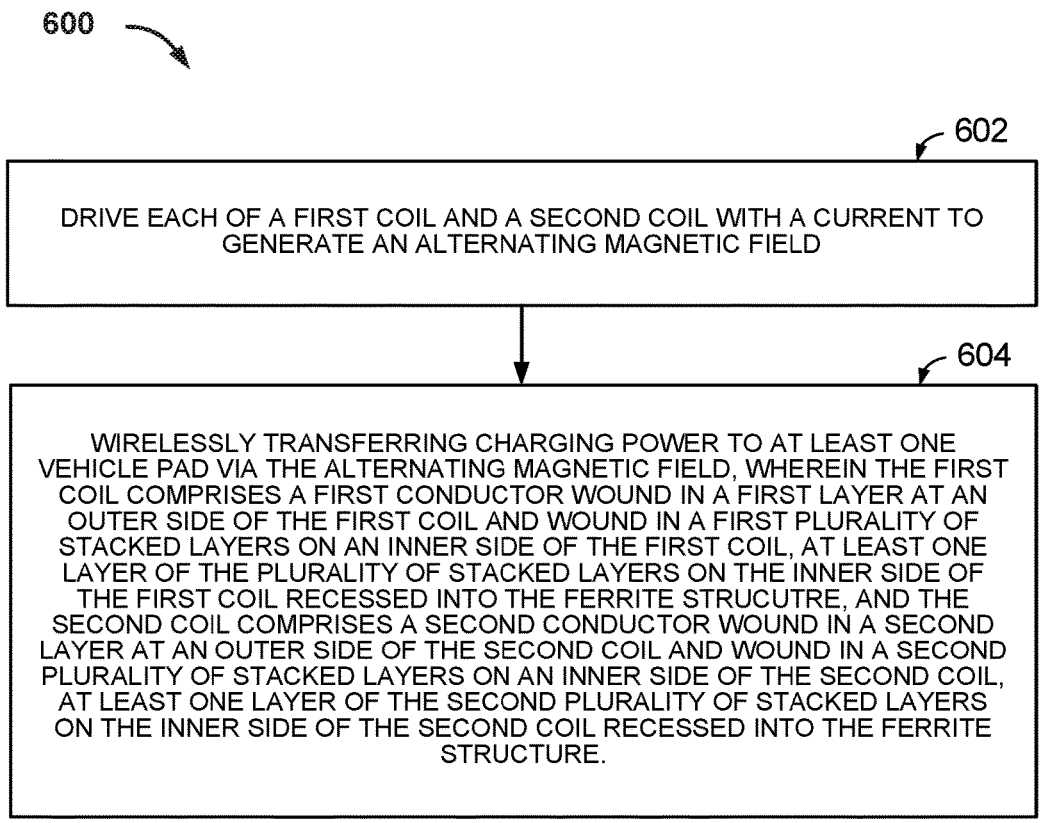
FIG. 6 is a flowchart depicting a method for wirelessly transferring charging power, in accordance with some implementations.

FIG. 6 is a flowchart depicting a method for wirelessly transferring charging power, in accordance with some implementations. The method of flowchart 600 is described herein with reference to the coil arrangement as previously described in connection with FIG. 5. Although the method of flowchart 600 is described herein with reference to a particular order, in various implementations, blocks herein may be performed in a different order, or omitted, and additional blocks may be added.

The flowchart 600 may start with block 602, which includes driving each of a first coil and a second coil with a current to generate an alternating magnetic field. For example, a transmit circuit (e.g., the transmit circuitry 206 of FIG. 2) may be configured to drive each of the first coil 504 and a second coil 506 with a current to generate an alternating magnetic field 205.

Block 604 includes wirelessly transferring charging power to at least one vehicle pad via the alternating magnetic field. For example, the base pad 500 may be configured to wirelessly transfer charging power to at least one vehicle pad (e.g., a vehicle pad including the receiver 208 shown in FIG. 2) via the alternating magnetic field 205. The first coil 504 comprises a first conductor wound in a first single layer at an outer side of the first coil 504 and wound in a first plurality of stacked layers on an inner side 508 of the first coil 504. At least one layer of the first plurality of stacked layers on the inner side 508 of the first coil 504 is recessed into the ferrite structure 502. The second coil 506 comprises a second conductor wound in a second single layer at an outer side of the second coil 506 and wound in a second plurality of stacked layers on an inner side 510 of the second coil 506. At least one layer of the second plurality of stacked layers on the inner side 510 of the second coil 506 is recessed into the ferrite structure 502.

In various embodiments, the first coil and the second coil can form at least a portion of a double D coil configuration. In various embodiments, successive windings of the first coil can be separated by a nonzero distance at the outer side of the first coil and successive windings of the second coil can be separated by a nonzero distance at the outer side of the second coil. In various embodiments, successive windings of the first coil can be substantially in physical contact at the outer side of the first coil and successive windings of the second coil can be substantially in physical contact at the outer side of the second coil.

In various embodiments, the ferrite structure, the first coil and the second coil can be buried below a driving surface. In various embodiments, the ferrite structure, the first coil and the second coil can be flush mounted in a driving surface. In various embodiments, the ferrite structure can extend laterally beyond edges of the first coil and the second coil to form a ferrite border along an entire perimeter of the first coil and the second coil.

In various embodiments, one or both of the first layer and the second layer can include a single layer. In various embodiments, either the first layer at the outer side of the first coil can be wider than the first plurality of stacked layers on the inner side of the first coil, the second layer at the outer side of the second coil can be wider than the second plurality of stacked layers on the inner side of the second coil, or both. In various embodiments, the method can further include providing current to the first coil and to the second coil, such that current on the inner side of the first coil travels in the same direction as current on the inner side of the second coil.

Figure 7:
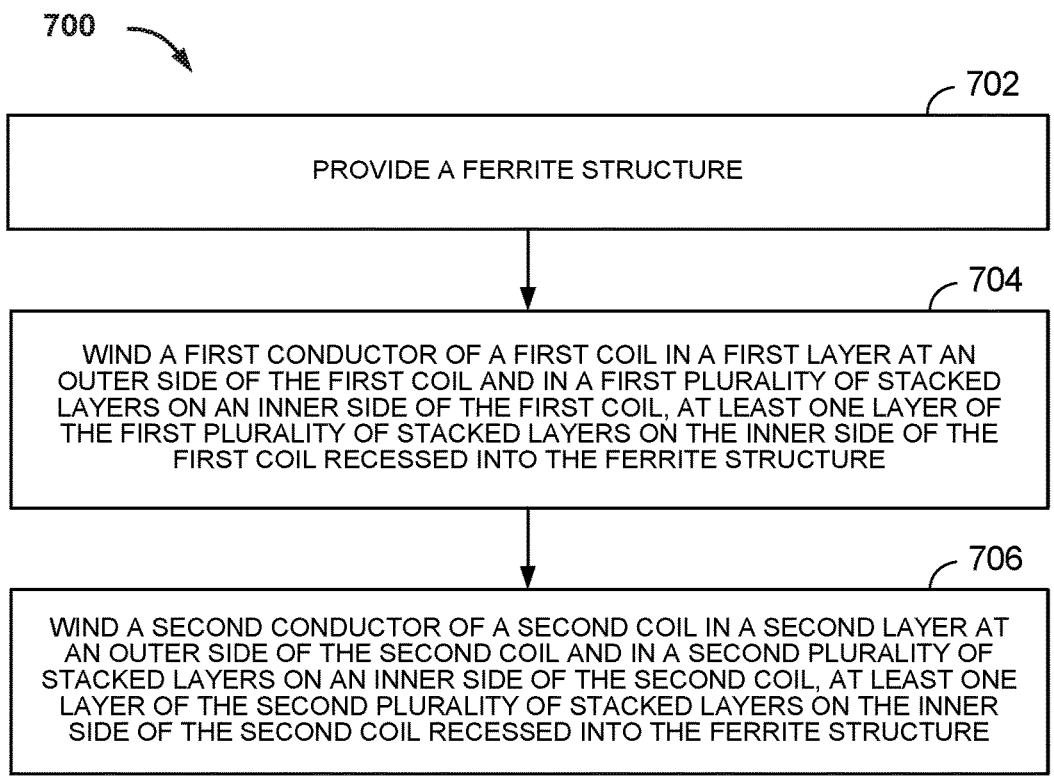
FIG. 7 is a flowchart depicting a method for fabricating an apparatus for wirelessly transferring charging power, in accordance with some implementations.

FIG. 7 is a flowchart 700 depicting a method for fabricating an apparatus for wirelessly transferring charging power, in accordance with some implementations. The method of flowchart 700 is described herein with reference to the coil arrangement as previously described in connection with FIG. 5. Although the method of flowchart 700 is described herein with reference to a particular order, in various implementations, blocks herein may be performed in a different order, or omitted, and additional blocks may be added.

The flowchart 700 may start with block 702, which includes providing a ferrite structure. For example, the ferrite structure 502 may be provided with recessed portions configured to receive the first coil 504 and the second coil 506, as described in connection with FIG. 5.

Block 704 includes winding a first conductor of a first coil in a first single layer at an outer side of the first coil and in a first plurality of stacked layers on an inner side of the first coil, at least one layer of the first plurality of stacked layers on the inner side of the first coil recessed into a ferrite structure. For example, as shown in view 550 of FIG. 5, a first conductor of the first coil 504 may be wound in a first single layer at an outer side 512 of the first coil 504 and in a first plurality of stacked layers on an inner side 508 of the first coil 504. At least one layer of the first plurality of stacked layers on the inner side 508 of the first coil 504 is recessed into the ferrite structure 502.

Block 706 includes winding a second conductor of a second coil in a second single layer at an outer side of the second coil and in a second plurality of stacked layers on an inner side of the second coil, the second coil recessed into the ferrite structure. For example, as shown in view 550 of FIG. 5, a second conductor of the second coil 506 may be wound in a second single layer at an outer side 514 of the second coil 506 and in a second plurality of stacked layers on an inner side 510 of the second coil 506. At least one layer of the second plurality of stacked layers on the inner side 510 of the first coil 506 is recessed into the ferrite structure 502.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wirelessly transferring charging power, comprising:
   a ferrite structure;
   a first coil comprising a first conductor wound in a first layer at an outer side of the first coil and wound in a first plurality of stacked layers on an inner side of the first coil, at least one layer of the first plurality of stacked layers on the inner side of the first coil recessed into the ferrite structure; and
   a second coil comprising a second conductor wound in a second layer at an outer side of the second coil and wound in a second plurality of stacked layers on an inner side of the second coil, at least one layer of the second plurality of stacked layers on the inner side of the second coil recessed into the ferrite structure.

2. The apparatus of claim 1, wherein the first coil and the second coil form at least a portion of a double D coil configuration.

3. The apparatus of claim 1, wherein successive windings of the first coil are separated by a nonzero distance at the outer side of the first coil and successive windings of the second coil are separated by a nonzero distance at the outer side of the second coil.

4. The apparatus of claim 1, wherein successive windings of the first coil are substantially in physical contact at the outer side of the first coil and successive windings of the second coil are substantially in physical contact at the outer side of the second coil.

5. The apparatus of claim 1, wherein the ferrite structure, the first coil and the second coil are buried below a driving surface.

6. The apparatus of claim 1, wherein the ferrite structure, the first coil and the second coil are flush mounted in a driving surface.

7. The apparatus of claim 1, wherein the ferrite structure extends laterally beyond edges of the first coil and the second coil to form a ferrite border along an entire perimeter of the first coil and the second coil.

8. The apparatus of claim 1, wherein one or both of the first layer and the second layer comprises a single layer.

9. The apparatus of claim 1, wherein at least one of:
the first layer at the outer side of the first coil is wider than the first plurality of stacked layers on the inner side of the first coil; and
the second layer at the outer side of the second coil is wider than the second plurality of stacked layers on the inner side of the second coil.

10. The apparatus of claim 1, further comprising at least one driver configured to provide current to the first coil and to the second coil, such that current on the inner side of the first coil travels in the same direction as current on the inner side of the second coil.

11. A method for wirelessly transferring charging power, comprising:
driving each of a first coil and a second coil with a current to generate an alternating magnetic field; and
wirelessly transferring charging power to at least one vehicle pad via the alternating magnetic field, wherein:
the first coil comprises a first conductor wound in a first layer at an outer side of the first coil and wound in a first plurality of stacked layers on an inner side of the first coil, at least one layer of the first plurality of stacked layers on the inner side of the first coil recessed into a ferrite structure, and
the second coil comprises a second conductor wound in a second layer at an outer side of the second coil and wound in a second plurality of stacked layers on an inner side of the second coil, at least one layer of the second plurality of stacked layers on the inner side of the second coil recessed into the ferrite structure.

12. The apparatus of claim 1, wherein the ferrite structure overlaps the outer side and the inner side of the first coil, the ferrite structure further overlapping the outer side and the inner side of the second coil.

13. The apparatus of claim 1, wherein the second coil is positioned coplanar relative to the first coil wherein the inner side of the first coil is positioned adjacent to the inner side of the second coil.

14. An apparatus for wirelessly transferring charging power, comprising:
a first coil comprising a first plurality of conductive windings wound about a first opening, wherein the first plurality of conductive windings are wound in a first plurality of stacked layers on a first side of the first coil wherein the number of layers on the first side of the first coil is greater than the number of layers on a second side of the first coil; and
a second coil positioned substantially co-planar with the first coil and comprising a second plurality of conductive windings wound about a second opening, wherein the second plurality of conductive windings are wound in a second plurality of stacked layers on a third side of the second coil wherein the number of layers on the third side of the second coil is greater than the number of layers on a fourth side of the second coil, wherein the first side of the first coil is positioned closer to the third side of the second coil than to the fourth side of the second coil; and
a ferrite structure overlapping at least a portion of the first coil and the second coil.

15. The apparatus of claim 14, wherein at least a portion of the first plurality of stacked layers are recessed into the ferrite structure.

16. The apparatus of claim 14, wherein the number of layers on the second side of the first coil, and/or the number of layers on the second side of the second coil, is one.

17. The apparatus of claim 14, wherein the first coil is laterally displaced from the second coil such that the first side of the first coil is adjacent to the third side of the second coil.

18. The apparatus of claim 14, further comprising at least one driver configured to provide current to the first coil and to the second coil, such that current on the first side of the first coil travels in the same direction as current on the third side of the second coil.

19. The apparatus of claim 14, further comprising a resonant circuit comprising the first and second coil.

20. The apparatus of claim 14, wherein successive windings of the first coil are separated by a nonzero distance at the second side of the first coil and successive windings of the second coil are separated by a nonzero distance at the fourth side of the second coil.

21. The apparatus of claim 14, wherein the ferrite structure extends laterally beyond edges of the first coil and the second coil to form a ferrite border along an entire perimeter of the first coil and the second coil.

22. The apparatus of claim 14, wherein at least one of:
the first layer at the second side of the first coil is wider than the first plurality of stacked layers on the first side of the first coil; and
the second layer at the fourth side of the second coil is wider than the second plurality of stacked layers on the third side of the second coil.

23. The apparatus of claim 14, wherein the ferrite structure overlaps the first side and the second side of the first coil, the ferrite structure further overlapping the first side and the second side of the second coil.

* * * * *